(12) United States Patent
Luczak et al.

(10) Patent No.: US 8,122,583 B2
(45) Date of Patent: Feb. 28, 2012

(54) METHOD OF MACHINING PARTS HAVING HOLES

(75) Inventors: Blake J. Luczak, Manchester, CT (US);
Glenn A. Cotnoir, Thompson, CT (US);
James T. Beals, West Hartford, CT (US);
Thomas M. Morin, Terryville, CT (US);
Joseph J. Parkos, Jr., East Haddam, CT (US)

(73) Assignee: United Technologies Corporation, Hartford, CT (US)

( * ) Notice: Subject to any disclaimer, the term of this patent is extended or adjusted under 35 U.S.C. 154(b) by 1302 days.

(21) Appl. No.: 11/758,160

(22) Filed: Jun. 5, 2007

(65) Prior Publication Data

US 2009/0095435 A1    Apr. 16, 2009

(51) Int. Cl.
*B23P 17/00* (2006.01)
*B05D 1/18* (2006.01)
*B05C 3/02* (2006.01)

(52) U.S. Cl. ......... 29/527.6; 29/527.2; 29/423; 29/424; 164/35; 164/132; 427/508; 427/510; 427/512; 427/156; 427/226; 427/282; 427/287; 427/289; 427/292; 427/435

(58) Field of Classification Search ............... 29/527.2, 29/527.6, 423, 424; 164/132, 345, 369, 341, 164/34, 35; 415/50; 427/508, 510, 512, 427/156, 226, 282, 287, 289, 292, 295, 435
See application file for complete search history.

(56) References Cited

U.S. PATENT DOCUMENTS

| 4,183,456 | A | * | 1/1980 | Schilling et al. | 228/175 |
|---|---|---|---|---|---|
| 5,251,276 | A | * | 10/1993 | Berkey et al. | 385/43 |
| 5,630,879 | A | * | 5/1997 | Eichmann et al. | 118/720 |
| 6,322,671 | B1 | * | 11/2001 | Mingazhev | 204/192.1 |
| 6,499,949 | B2 | * | 12/2002 | Schafrik et al. | 416/97 R |
| 6,924,002 | B2 | * | 8/2005 | Lee et al. | 427/252 |
| 7,243,700 | B2 | * | 7/2007 | Beals et al. | 164/132 |
| 7,686,068 | B2 | * | 3/2010 | Tholen et al. | 164/369 |
| 2006/0021579 | A1 | * | 2/2006 | Bernaski et al. | 118/720 |

FOREIGN PATENT DOCUMENTS

| JP | 57-027625 A | | 2/1982 |
|---|---|---|---|
| JP | 57027625 A | * | 2/1982 |
| JP | 2004-123398 A | | 4/2004 |
| JP | 2004123398 A | * | 4/2004 |
| JP | 2007-118083 A | | 5/2007 |

OTHER PUBLICATIONS

JP Office action for JP Patent Application No. 2008-96762, dated Dec. 7, 2010.

* cited by examiner

*Primary Examiner* — Sarang Afzali
(74) *Attorney, Agent, or Firm* — Bachman & LaPointe, P.C.

(57) ABSTRACT

Removing of a casting core from a metal casting leaves at least one opening in a surface of the metal. The opening is filled with a sacrificial material. The metal and sacrificial material are machined at the opening. After the machining, a remainder of the sacrificial material is removed.

21 Claims, 8 Drawing Sheets

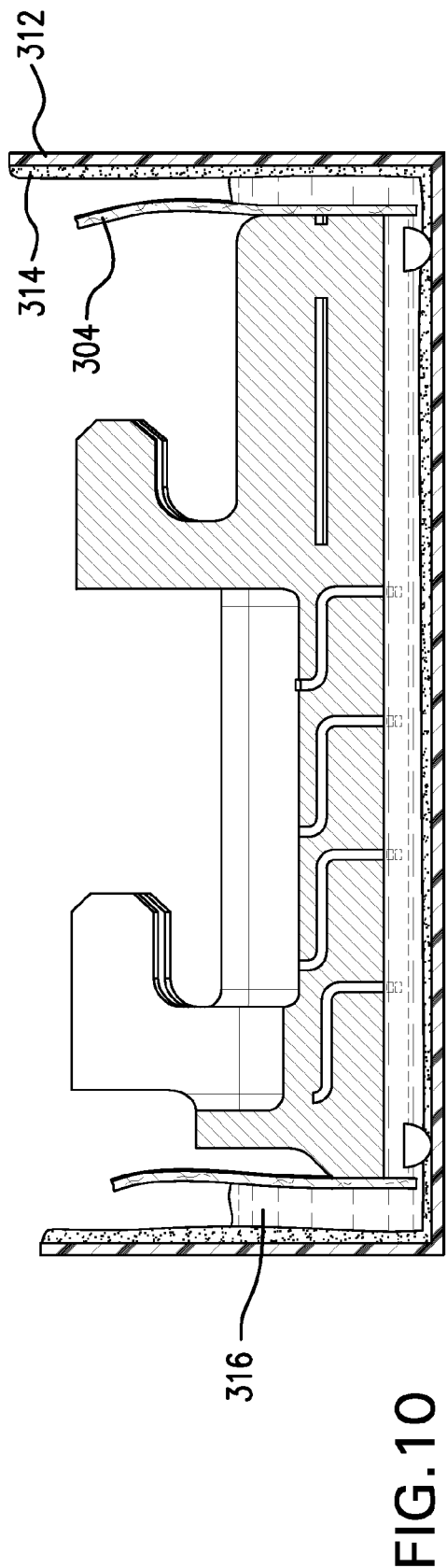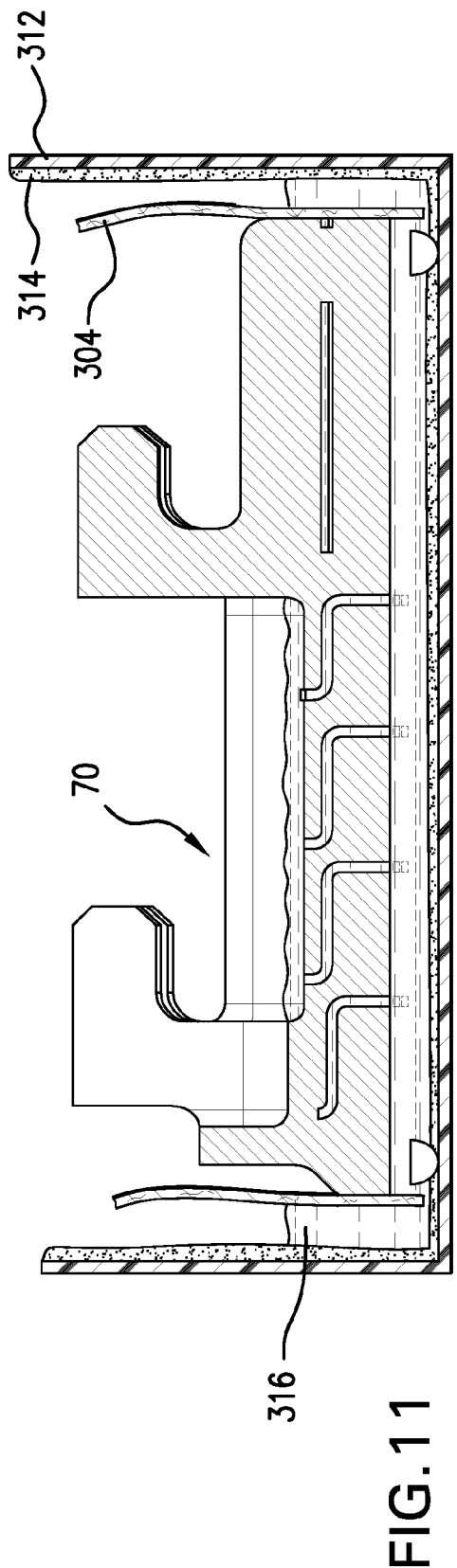

METHOD OF MACHINING PARTS HAVING HOLES

U.S. GOVERNMENT RIGHTS

The invention was made with U.S. Government support under contract F33615-03-D-2354 awarded by the U.S. Air Force. The U.S. Government has certain rights in the invention.

BACKGROUND

The disclosure relates to gas turbine engines. More particularly, the disclosure relates to machining of components having cast internal passageways.

Various gas turbine engine components are formed by investment casting followed by machining. Examples include cooled shrouds or blade outer air seals (BOAS). BOAS segments may be internally cooled by bleed air. For example, there may be an upstream-to-downstream array of circumferentially-extending cooling passageway legs within the BOAS segment. Cooling air may be fed into the passageway legs from the outboard (OD) side of the BOAS segment (e.g., via one or more inlet ports (inlets) at ends of the passageway legs). The cooling air may exit the legs through outlet ports (outlets). The outlets may be in the circumferential ends (matefaces) of the BOAS segment so as to be vented into the adjacent inter-segment region. The vented air may, for example, help cool adjacent BOAS segments and purge the gap to prevent gas ingestion. The outlets may also be in the longitudinal ends. The outlets may also be along the inboard (ID) side/face of the BOAS segment.

The BOAS segments may be cast via an investment casting process. In an exemplary casting process, a ceramic casting core is used to form the passageway legs. The core has legs corresponding to the passageway legs. The core legs extend between first and second end portions of the core. The core may be placed in a die. Wax may be molded in the die over the core legs to form a pattern. The pattern may be shelled (e.g., a stuccoing process to form a ceramic shell). The wax may be removed from the shell. Metal may be cast in the shell over the core. The shell and core may be destructively removed. After core removal, the core legs leave the passageway legs in the casting. The as-cast passageway legs are typically open at both circumferential ends of the raw BOAS casting. At least some of the end openings may be closed via plug welding, braze pins, or other means. The casting may be machined to provide a desired precise shape.

The air inlets to the passageway legs from the OD side of the casting may be formed during the original casting or by subsequent machining (e.g., drilling). The air outlets from the passageway legs to the ID side of the casting may similarly be formed.

SUMMARY

Accordingly, one aspect of the disclosure involves a method including casting metal in a mold cavity. The mold includes a shell and a casting core partially embedded in the shell. The shell and core are removed from the cast metal. The removing leaves at least one opening in a surface of the metal. The opening is left by the casting core. The opening is filled with a sacrificial material. The metal and sacrificial material are machined at the opening. After the machining, a remainder of the sacrificial material is removed.

In various implementations, the core may be a core assembly. The sacrificial material may be an epoxy. The filling may comprise flowing the epoxy through the opening and curing the epoxy. This filling may include an at least partial immersion in a vessel containing a liquid form of the sacrificial material.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 10 is a longitudinal sectional view of the casting of FIG. 4 during an initial stage of immersion.
FIG. 11 is a longitudinal sectional view of the casting of FIG. 10 in a subsequent stage of immersion.

Like reference numbers and designations in the various drawings indicate like elements.

DETAILED DESCRIPTION

Figure 1:
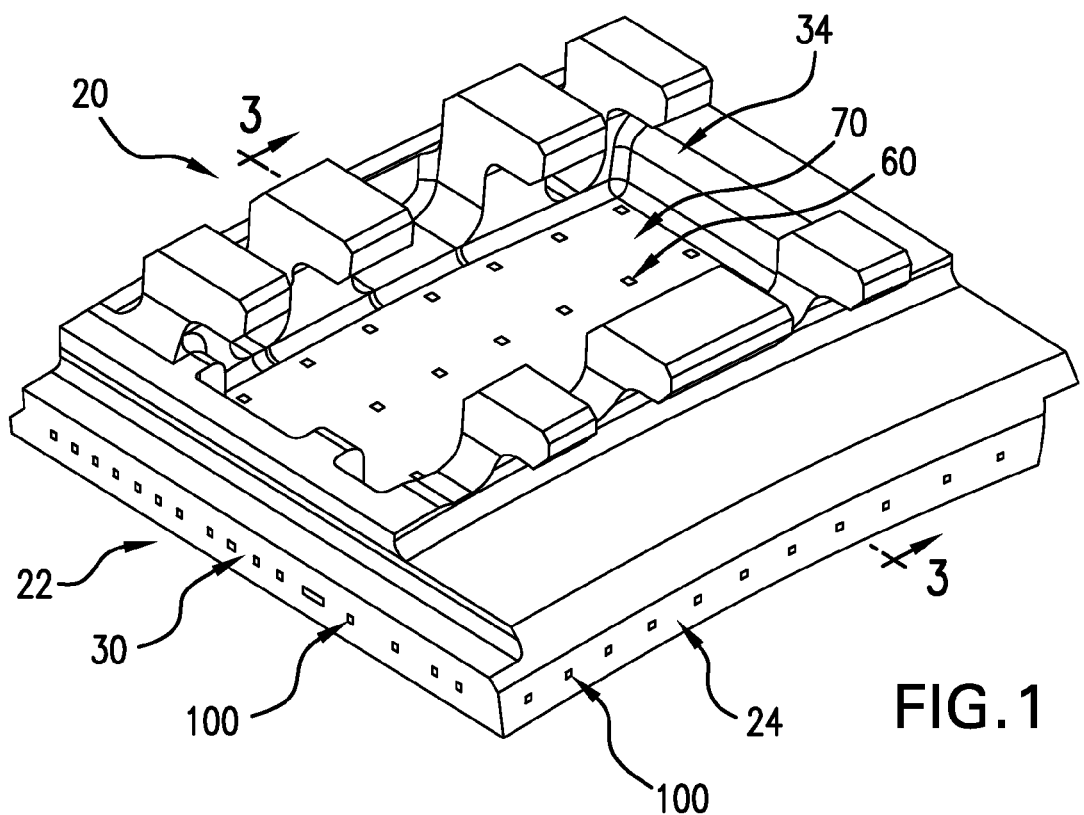
FIG. 1 is a view of a blade outer air seal (BOAS) segment.
Figure 2:
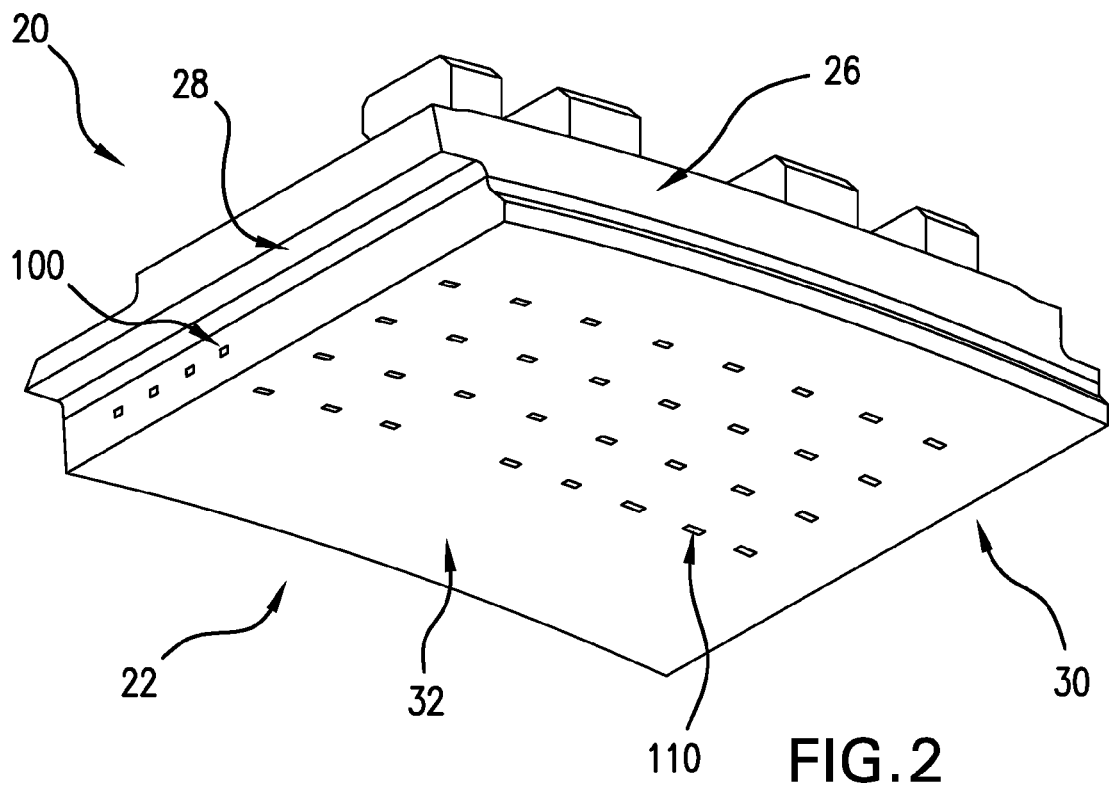
FIG. 2 is another view of the BOAS segment of FIG. 1.

FIGS. 1 and 2 show blade outer air seal (BOAS) segment 20. The BOAS segment has a main body portion 22 having a leading/upstream/forward end 24 and a trailing/downstream/aft end 26. The body has first and second circumferential ends or matefaces 28 and 30. The body has an ID side/face 32 and an OD side/face 34. To mount the BOAS to environmental structure 40 (FIG. 3), the exemplary BOAS segment has a plurality of mounting hooks. The exemplary BOAS segment has a plurality of forward mounting hooks 42, each having a forwardly-projecting distal portion. The exemplary BOAS segment has a plurality of aft hooks 44 each having a forwardly-projecting distal portion.

A circumferential ring array of a plurality of the BOAS segments 20 may encircle an associated blade stage of a gas turbine engine. The assembled ID faces 32 thus locally bound an outboard extreme of the core flowpath 48 (FIG. 3) proximate the sweep of the tips of the associated stage of blades (not shown). The BOAS segment 20 may have features for interlocking the array. Exemplary features include finger and shiplap joints.

Figure 3:
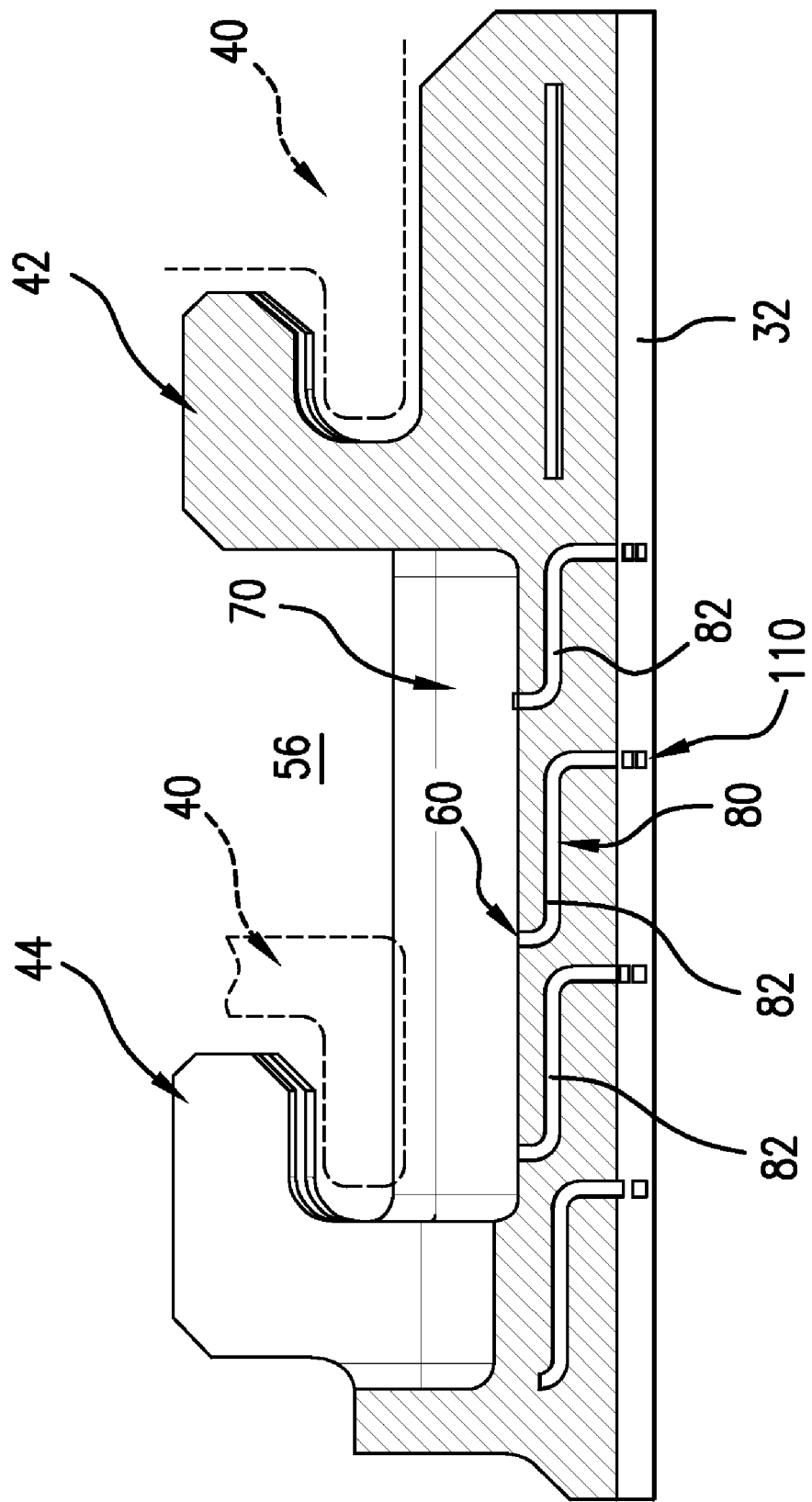
FIG. 3 is a sectional view of the BOAS segment of FIG. 1, taken along line 3-3.

The BOAS may be air-cooled. For example, bleed air may be directed to a chamber 56 (FIG. 3) immediately outboard of the face 34. The bleed air may be directed to inlet ports (inlets) 60 in the base of a well 70 in the OD face. The air passes through the inlets and into an internal cooling passageway 80 (FIG. 3, e.g., a simple plenum or a network). An exemplary network includes a plurality of circumferentially-extending legs 82. The passageway 80 may have a plurality of outlets. Exemplary outlets may include lateral perimeter outlets along one or more of the longitudinal ends 24 and 26 and the circumferential ends 28 and 30. In the exemplary BOAS segment 22, outlets 100 are formed along the leading end 24 and the circumferential ends 28 and 30 and outlets 110 are formed along the ID face 32.

Figure 4:
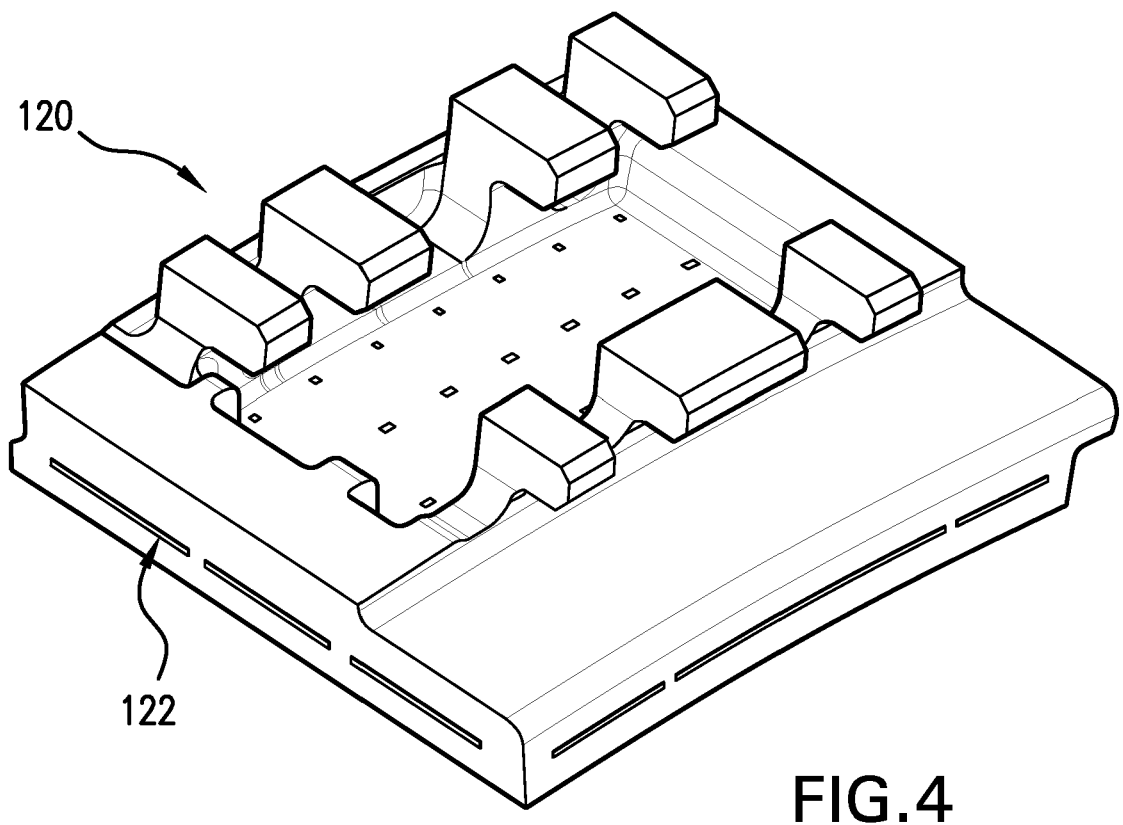
FIG. 4 is a view of the BOAS segment of FIG. 1 as-cast.
Figure 5:
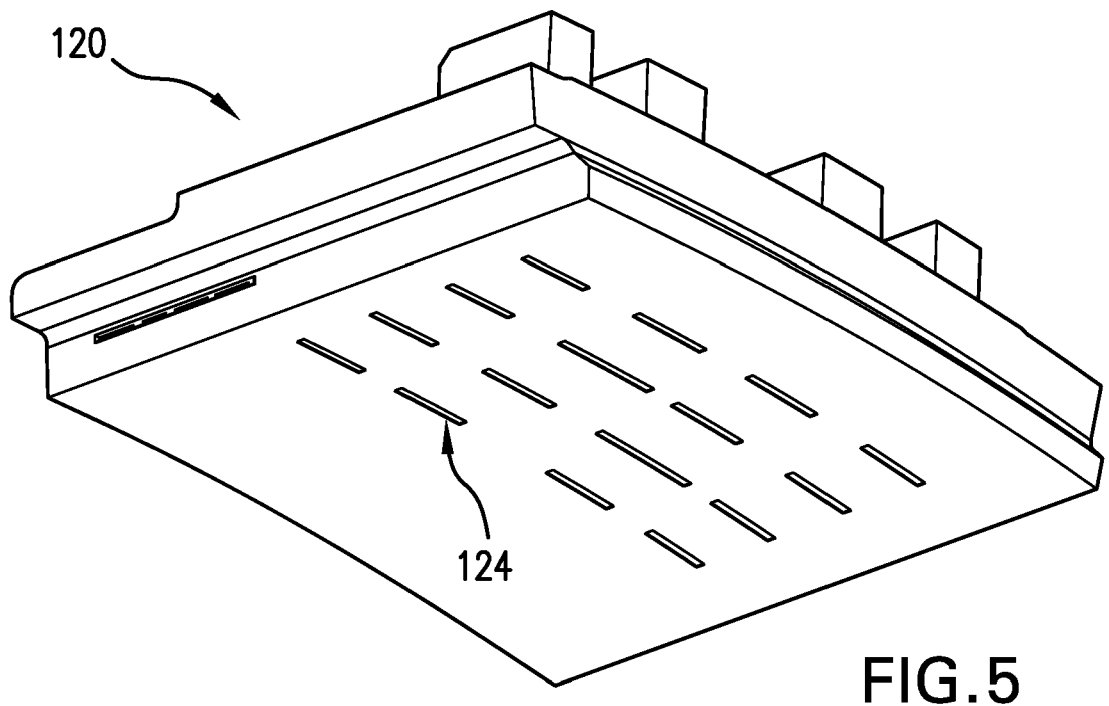
FIG. 5 is another view of the as-cast segment of FIG. 4.
Figure 6:
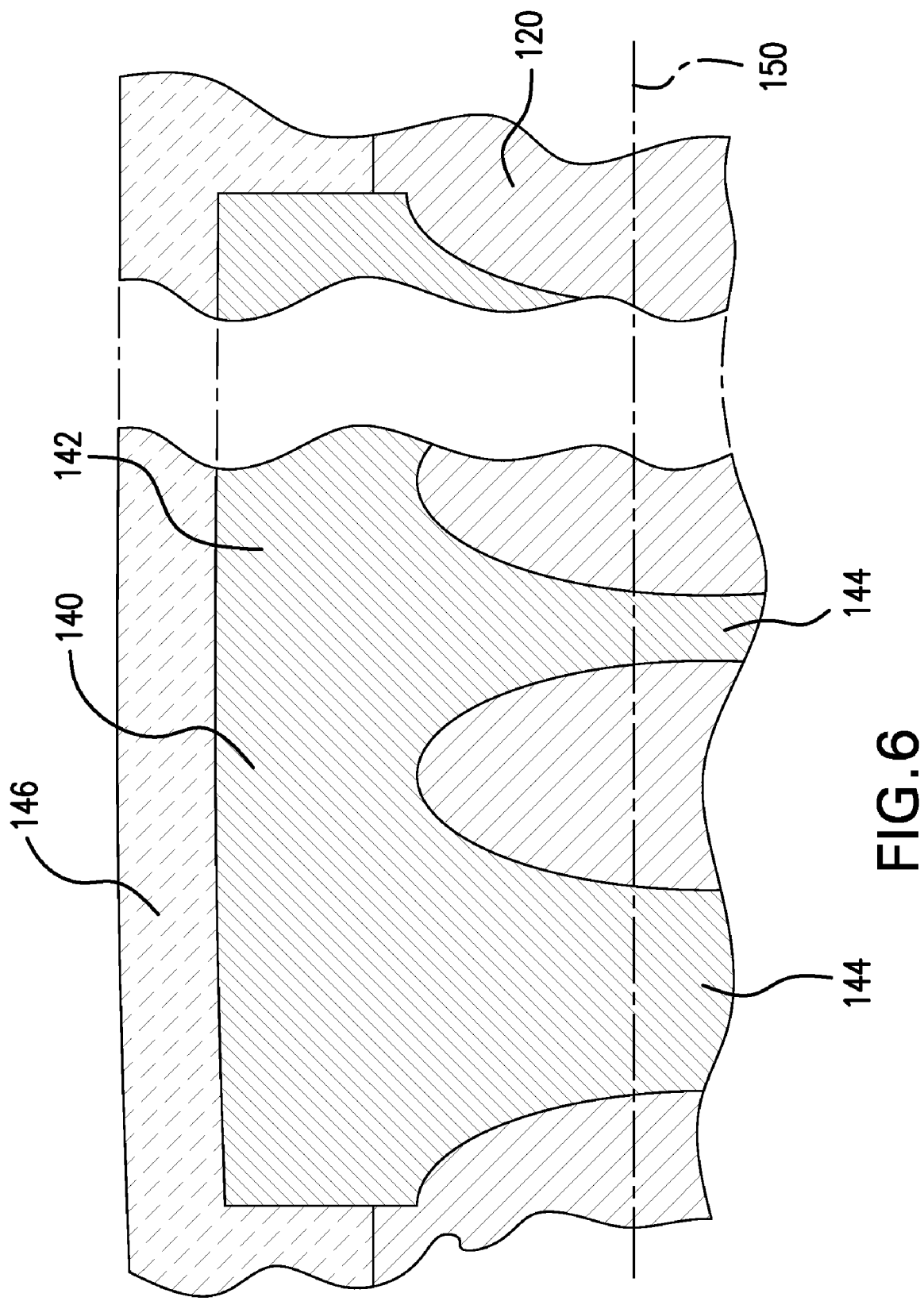
FIG. 6 is a partial sectional view of the cast segment with a shell and casting core.

The exemplary BOAS segment is manufactured by casting followed by finish machining. The casting forms an as-cast BOAS segment having rough features corresponding to the features of the final BOAS segment. The exemplary casting forms the internal passageways, the perimeter outlets, the ID outlets, and the OD inlets. FIGS. 4 and 5 show an as-cast casting 120 for the segment 20. The ultimate outlets 100 and 110 are recessed below the surface of the casting at slots 122 and 124. The slots may be formed by a portion 140 (FIG. 6) of an RMC 142 connecting outboard ends of legs 144 of the RMC. The exemplary portion 140 is partially embedded in the shell 146 for the casting of the metal of the casting 120. Portions of the legs 144 at the subsequently-machined surface contour 150 cast the openings of the outlets.

We have noticed potential problems associated with machining such a raw casting. The machining may introduce loose grindings or shavings into the casting through the openings of the casting's inlets and outlets. The machining may introduce attached shavings into the passageways. The machining may cause chipping at the openings. Accordingly, the present disclosure involves processes for pre-machining masking (e.g., plugging) of the openings to at least partially mitigate one or more of these problems.

Figure 7:
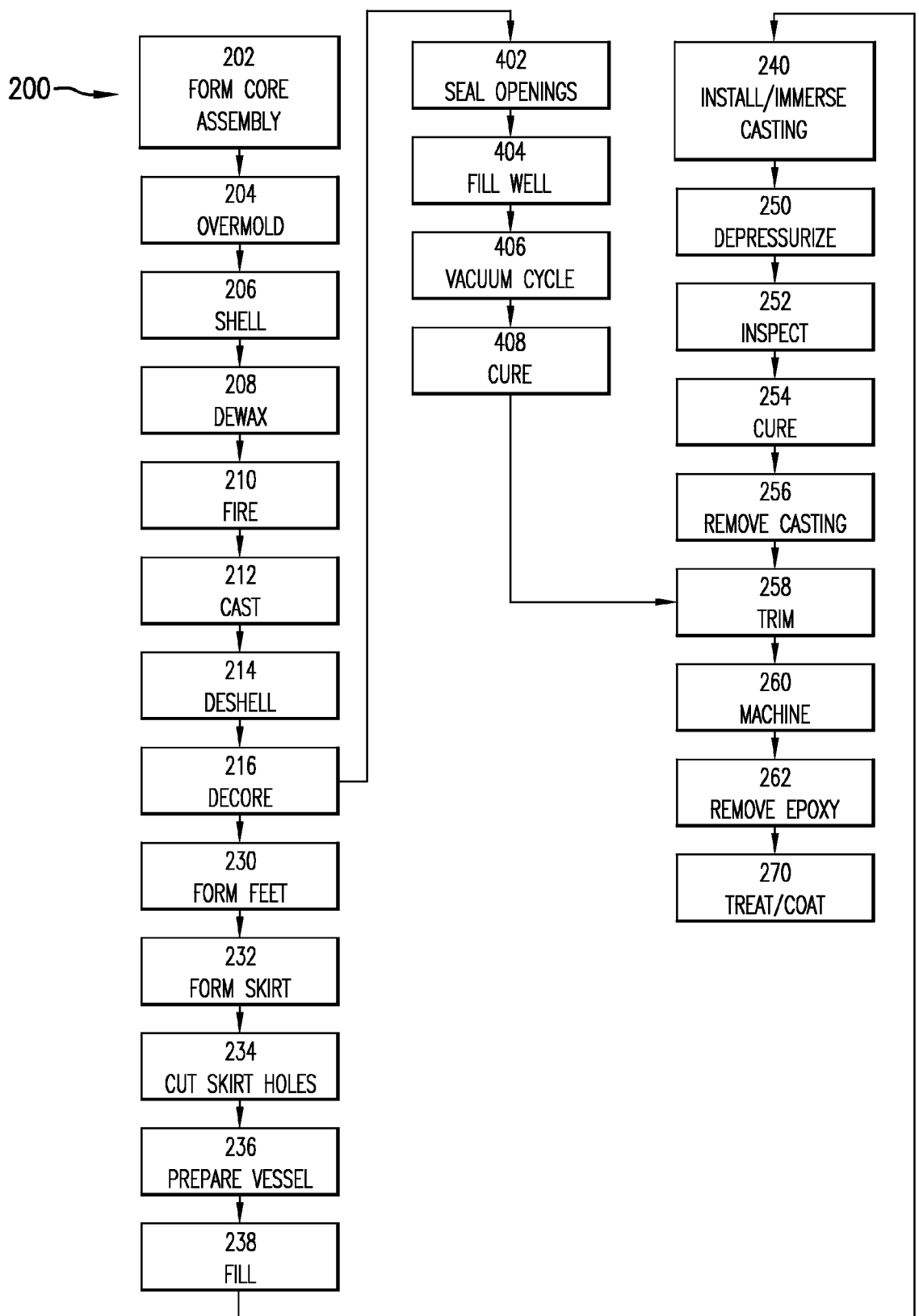
FIG. 7 is a flowchart of a process for manufacturing the BOAS segment of FIG. 1.

FIG. 7 is a flowchart of an exemplary BOAS segment manufacturing process including an exemplary plugging and machining. The process may, however, be used to make other articles. There may also be numerous variations on the process. The exemplary process 200 includes the forming 202 of a core assembly for casting the internal passageway(s). The exemplary core assembly includes a molded ceramic feedcore which forms the main passageway(s) and the perimeter outlets. The feedcore is assembled with one or more refractory metal cores (RMCs) for forming the OD inlets and ID outlets. The core assembly is overmolded 204 with pattern material (e.g., wax) to form a pattern. A shell is formed 206 over the pattern. The wax may be removed 208 (e.g., via a steam autoclave). The shell may be fired 210 to harden. Molten alloy may be cast 212 in the shell (e.g., poured and cooled). The shell may be removed 214 (e.g., mechanically broken away). The core assembly may be removed 216 (e.g., by chemical leaching) to leave a raw casting.

An exemplary plugging process is discussed below. The exemplary process uses immersion and vacuum techniques to introduce sacrificial fill material. Other fill techniques are possible. The exemplary process utilizes curable epoxy as fill material. Other fill materials are possible.

Figure 8:
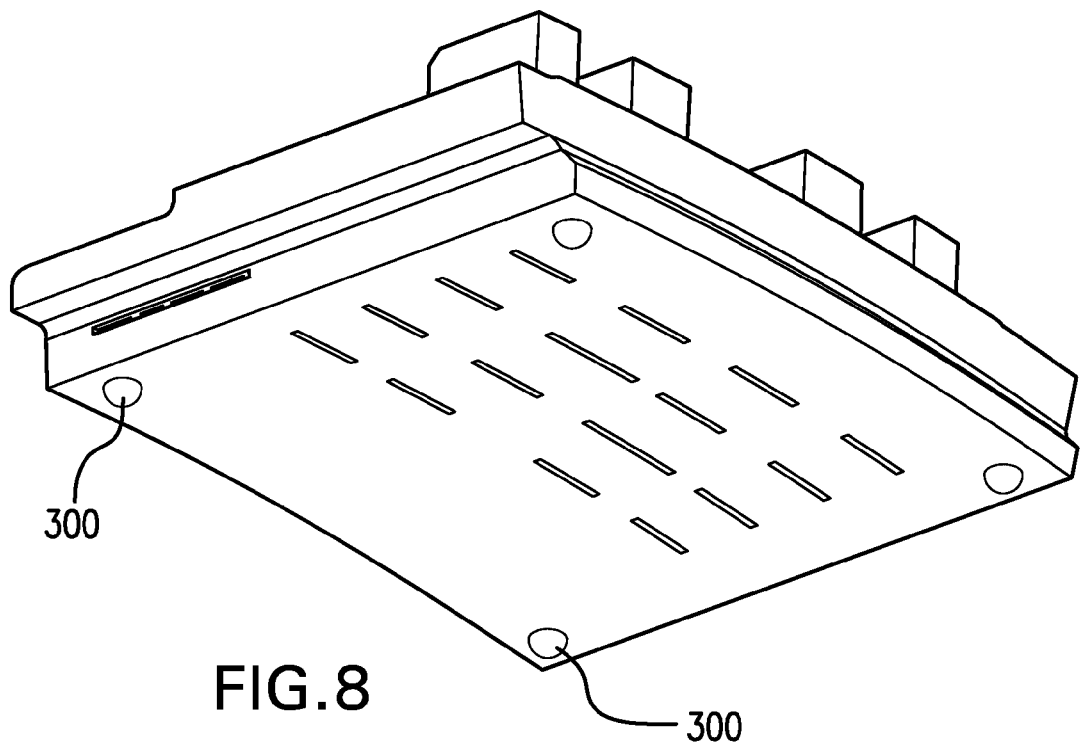
FIG. 8 is a view of the casting of FIG. 4 during application of feet.

A first exemplary process utilizes an open-top immersion vessel. The exemplary vessel is generic in that it does not have features specifically associated with the particular casting to be immersed. Several considerations may be particular to the plugging of a BOAS segment casting using a generic vessel instead of a custom vessel. Given the near flat ID face of the BOAS segment, it may be advantageous to hold the ID face spaced-apart from the bottom of the vessel to facilitate flow through the ID outlets. To do so, one or more supports (e.g., distinct feet) may be formed 230 on the ID face. Exemplary supports are formed by depositing epoxy (e.g., drops or beads) 300 (FIG. 8) on the ID face. The drops may then be cured. Exemplary epoxy is light-curable. An exemplary light-curable epoxy is SPEEDMASK 720 (available from DYMAX Corporation, Torrington, Conn.) having a nominal viscosity of 40,000 cps. Exemplary curing is in a UV light welder. Exemplary cured feet have a height of 1-4 mm.

Figure 9:
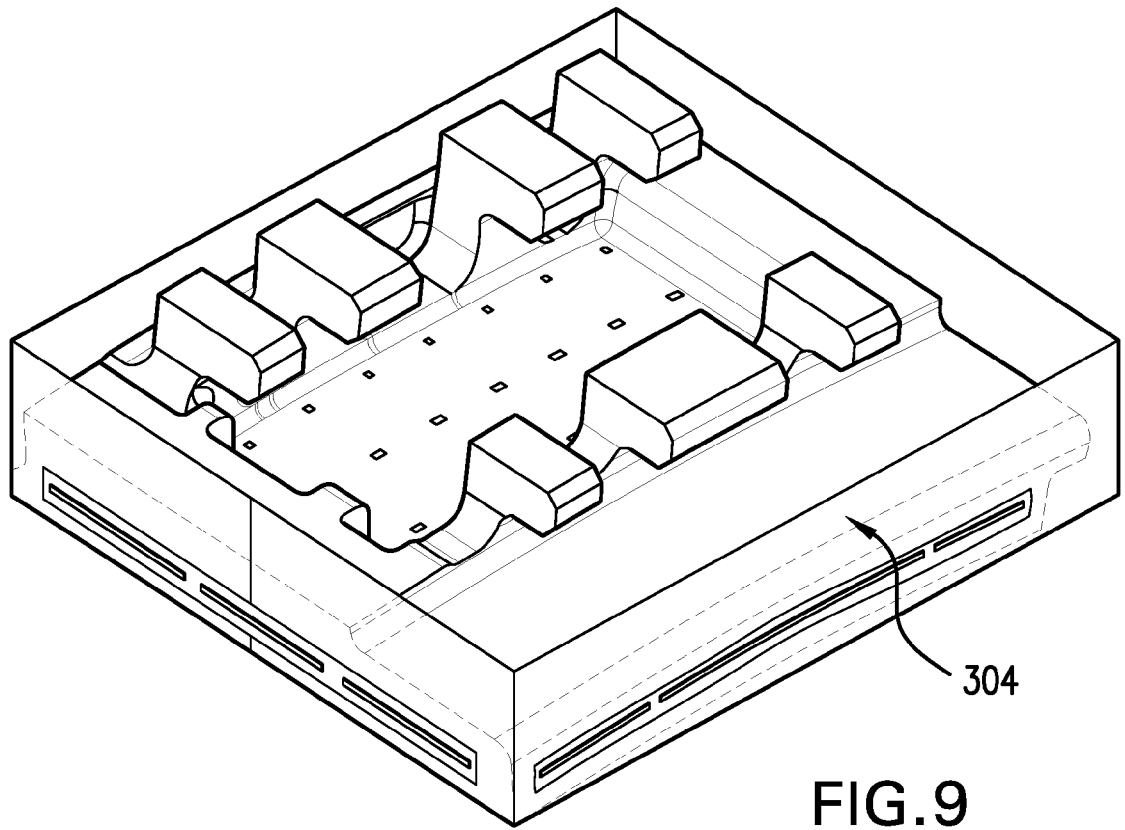
FIG. 9 is a view of the casting of FIG. 4 after a perimeter taping.

It may also be advantageous to protect certain areas of the casting against immersion. An exemplary protecting involves forming 232 an outwardly-extending skirt. An exemplary skirt 304 (FIG. 9) is formed by laterally wrapping tape around the casting perimeter. A proximal portion of the exemplary tape masks the matefaces and front and back ends of the casting main body. A distal portion of the tape extends outward to form the protruding portion of the skirt. Portions of the tape covering the perimeter outlets may be cut away 234 to at least partially expose the perimeter outlets (e.g., exposing the slots 122 provide the ultimate outlets) 100. The BOAS segment is thus prepared for immersion.

However, especially if the vessel is reusable, additional steps may be taken to prepare 236 the vessel 310 (FIG. 10). The vessel interior 312 may be coated with a mold release agent 314. The exemplary release agent is a grease. Alternatively, a solid liner may be installed to the vessel. The vessel may be filled 238 with the plug material 316 and the casting may be installed 240 to the vessel. Exemplary plug material is an epoxy, initially being uncured. An exemplary epoxy is SPEEDMASK 707 having a nominal viscosity of 500 cps. This is chosen to be relatively easily flowable through the small ID outlets and OD inlets. Alternatively, the order of installing the casting and pouring may be reversed.

A vacuum assist may be used to draw the liquid epoxy into the casting. An exemplary vacuum assist process includes an initial unassisted interval (e.g., about half an hour) to allow the epoxy to seep into the passageway network via the perimeter outlets and ID outlets. In the exemplary BOAS segment, the epoxy will flow upward and outward through the OD inlets to at least partially fill the well 70 (FIG. 11). The vessel and BOAS segment may then be transferred to a vacuum chamber and exposed 250 to reduced pressure/vacuum conditions. The vacuum will facilitate the evacuation of air bubbles from the epoxy. The immersed casting may be removed from the chamber and inspected 252 for adequacy of coverage. If necessary, more epoxy may be added to the vessel and the casting may be subjected to a further vacuum interval. Vibration and/or centrifuging could also assist in material flow and bubble removal. These may be performed in addition to or alternatively to the vacuum assist and may be performed before, after, and/or during the vacuum assist.

The epoxy may then be cured 254. An exemplary curing is light-assisted (e.g., as with the supports). The exemplary light-assisted curing includes an initial hand wanding to cure areas that might be blocked from exposure in the UV light welder's chamber. The vessel is then transferred to the chamber and exposed to UV light to further cure the epoxy. The exemplary light cure may be followed by a thermal cure. An exemplary thermal cure is in an atmospheric oven. The exemplary thermal cure is for at least one hour at a temperature of 225° F. (107° C.).

After the oven cure, the casting and epoxy may be removed 256 from the vessel. Portions of the tape and/or epoxy may be removed (trimmed) 258. Exemplary removal is by cutting away. This may be cut away from the fore and aft ends, and matefaces. The casting may then be machined 260. Exemplary machining involves machining along the well 70, the ID face, the fore and aft ends, the matefaces, and the hooks.

After machining, the cured epoxy may be removed 262. An exemplary removal is by heating. Exemplary heating is in a air furnace (e.g., at about 1350° F. (732° C.) for fifteen minutes or more, plus ramp-up and cool-down). The casting may be subject to further treatments and may be coated 270 (e.g., with a multi-layer thermal barrier coating (TBC)). However, one or more stages of the coating process may be performed before the epoxy removal 262.

Figure 12:
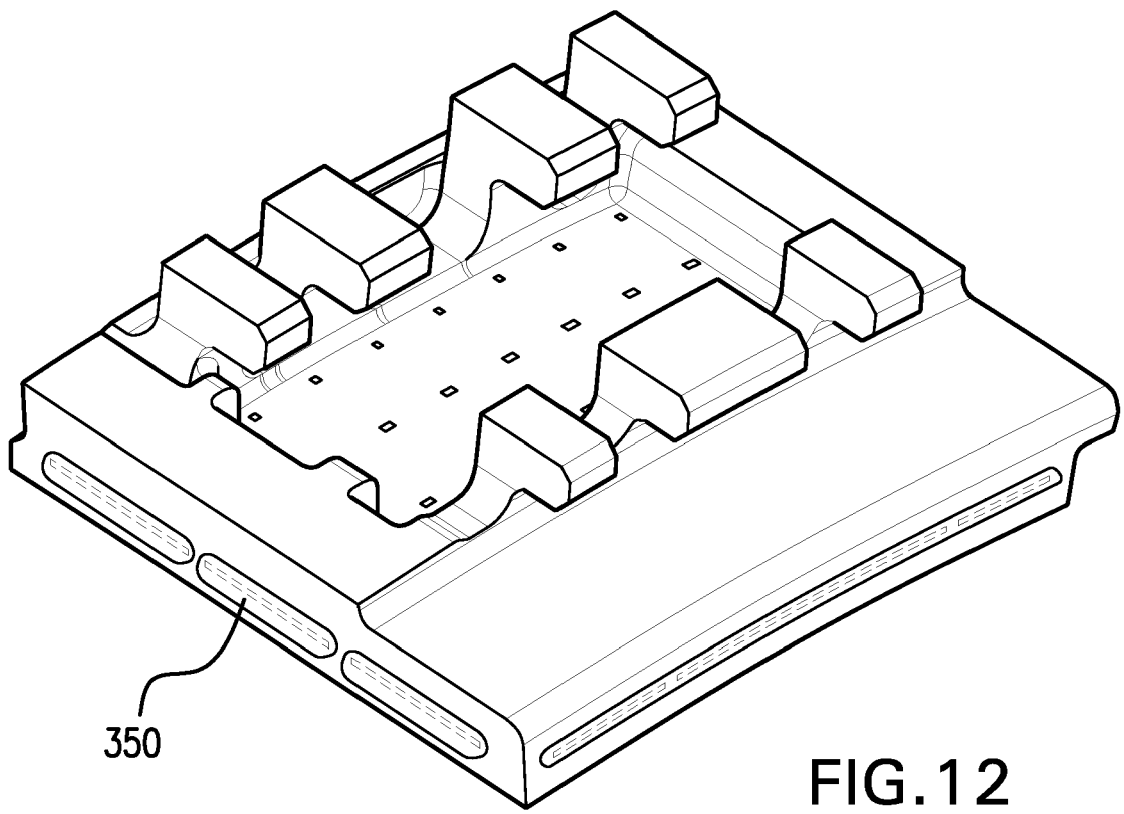
FIG. 12 is a view of the casting of FIG. 4 after an alternate masking.
Figure 13:
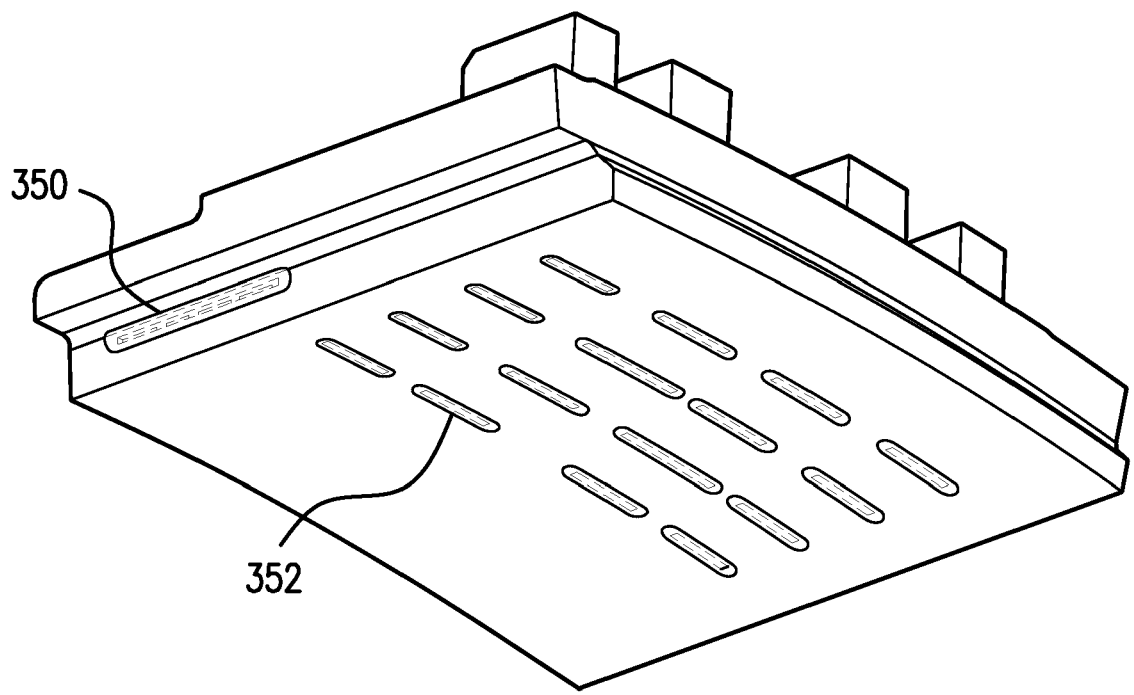
FIG. 13 is another view of the casting of FIG. 12.

Alternative non-immersion methods may also be used to introduce the material. One example of a non-immersion method involves initially sealing 402 some of the openings. For example, the perimeter openings and ID openings may be sealed. Exemplary sealing is via the application of viscous epoxy (e.g., SPEEDMASK 720) to the openings. For example, uncured epoxy may be applied across the lateral openings (e.g., as beads or drops 350 (FIG. 12)) and cured using a hand wand. An epoxy may then be applied across the ID openings (e.g., SPEEDMASK 720 in individual beads or drops 352 (FIG. 13)) and cured (e.g., via a light chamber). The casting may then be oriented ID face down and the well 70 at least partially filled 404 with additional uncured epoxy (e.g., a relatively low viscosity epoxy such as SPEEDMASK 707, or a less viscous analogue). One or more cycles 406 in a vacuum chamber may evacuate air from the casting and draw the epoxy from the well into the casting to fill the passageways. A light cure and/or thermal cure 408 may follow as above.

Additional alternative non-immersion methods involve vacuum injection of the resin.

In other variations, at least some of the passageways may be machined. This machining may be performed either before or after the plugging. For example, drilled OD inlets or ID outlets could be plugged for subsequent machining of the associated BOAS segment faces. Additionally or alternatively, drilling such inlets or outlets into a plugged feed passageway might reduce the formation of attached shavings at the feed passageway relative to drilling into an un-plugged feed passageway.

One or more embodiments have been described. Nevertheless, it will be understood that various modifications may be made. For example, details of the particular part to be cast and of the available equipment (e.g., the particular UV or thermal curing apparatus) as well as details of the particular machine tools to be used may influence details of any particular implementation. Although the methods may be used to manufacture existing parts, the availability of the methods may provide greater flexibility in selection of opening position, size, shape, and the like. Accordingly, other embodiments are within the scope of the following claims.

What is claimed is:

1. A method comprising:
    casting a metal in a mold cavity, the mold comprising a shell and a casting core partially embedded in the shell;
    removing the shell and core from the metal, the removing leaving at least one opening in a surface of the metal, the at least one opening formed by the casting core;
    masking with a non-liquid mask to form a skirt;
    filling the opening with a sacrificial material, the filling comprising, after the masking, an at least partial immersing in a vessel containing a liquid form of the material, wherein:
        during the immersing, the skirt allows an exposed portion of the metal to lie below a surface level of the liquid;
        one or more openings of the at least one opening are within the skirt;
        the immersing is sufficient to provide an up-flow of the liquid out of said one or more openings within the skirt responsive to introduction through another one or more others of the at least one opening outside the skirt;
    machining the metal and the sacrificial material at the at least one opening; and
    after the machining, removing a remainder of the sacrificial material.

2. The method of claim 1 wherein:
    the filling includes blocking a first plurality of the openings with a first epoxy of said material to seal the first plurality; and
    after said blocking, flowing a second epoxy of said material into the metal.

3. The method of claim 2 wherein the blocking includes UV-curing before the flowing of the second epoxy.

4. The method of claim 3 wherein after the blocking of the first plurality of openings and before the flowing of the second epoxy, a third epoxy of the material is applied across a second plurality of the openings and cured.

5. The method of claim 4 wherein the first epoxy and third epoxy are of the same composition but differing from a composition of the second epoxy.

6. The method of claim 3 wherein the UV-curing comprises wanding.

7. The method of claim 3 wherein the UV-curing comprises hand-wanding.

8. The method of claim 1 wherein:
    the filling comprises flowing an epoxy through the opening and curing the epoxy to form the sacrificial material.

9. The method of claim 8 wherein:
    the curing comprises UV curing.

10. The method of claim 1 wherein:
    the filling comprises applying at least one support to the metal before the immersing; and
    during the immersing, the at least one support supports the metal to provide access for the liquid to pass through said at least one opening.

11. The method of claim 1 wherein:
    the cast metal forms a blade outer air seal precursor having an ID face, an OD face, upstream and downstream ends, and first and second circumferential ends, the OD face including an OD well; and
    the one or more openings within the skirt are along the OD well.

12. The method of claim 1 wherein:
    the immersing is followed by exposure to a reduced pressure.

13. The method of claim 1 wherein:
    the immersing is followed by a UV curing.

14. The method of claim 1 wherein:
    the filling includes individually introducing through a plurality of the openings.

15. The method of claim 1 wherein:
    the removing of the remainder of the sacrificial material comprises heating.

16. The method of claim 1 further comprising:
    after the removing, applying a coating to the metal.

17. A method comprising:
    casting a metal in a mold cavity, the mold comprising a shell and a casting core partially embedded in the shell;
    removing the shell and core from the metal, the removing leaving at least one opening in a surface of the metal, the at least one opening formed by the casting core;
    filling the opening with a sacrificial material, the filling including:
    blocking a first plurality of openings with a first epoxy of said material to seal the first plurality; and
    after said blocking, flowing a second epoxy of said material into the metal, the blocking including UV-curing before the flowing of the second epoxy; machining the metal and the sacrificial material at the at least one opening; and after the machining, removing a remainder of the sacrificial material.

18. The method of claim 17 wherein after the blocking of the first plurality of openings and before the flowing of the second epoxy, a third epoxy of the material is applied across a second plurality of the openings and cured.

19. The method of claim 18 wherein the first epoxy and third epoxy are of the same composition but differing from a composition of the second epoxy.

20. The method of claim 17 wherein the UV-curing comprises wanding.

21. The method of claim 17 wherein the UV-curing comprises hand-wanding.

* * * * *